March 6, 1928. 1,661,760
J. P. KOCH
MODIFIED MULTIFOCAL LENS
Filed Oct. 10, 1923
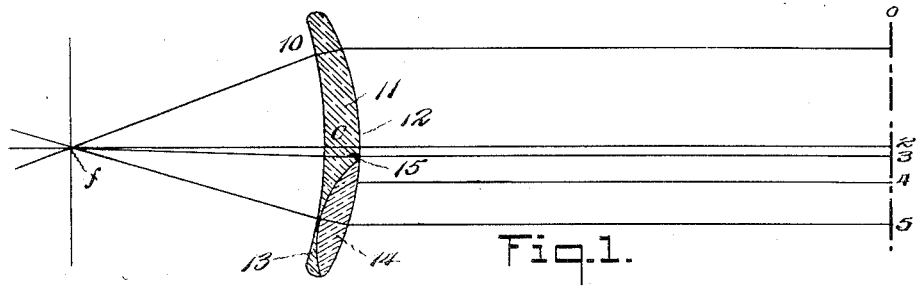
Fig.1.
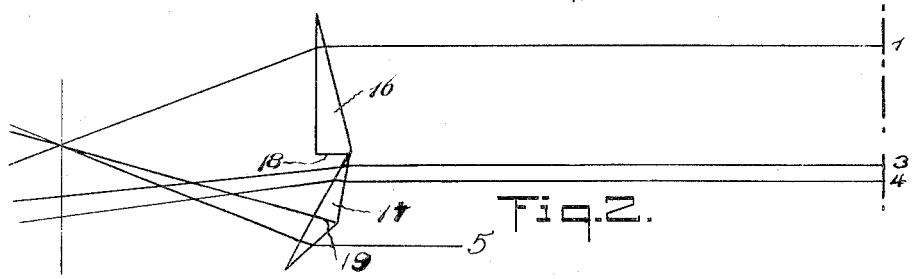
Fig.2.
Fig.3.
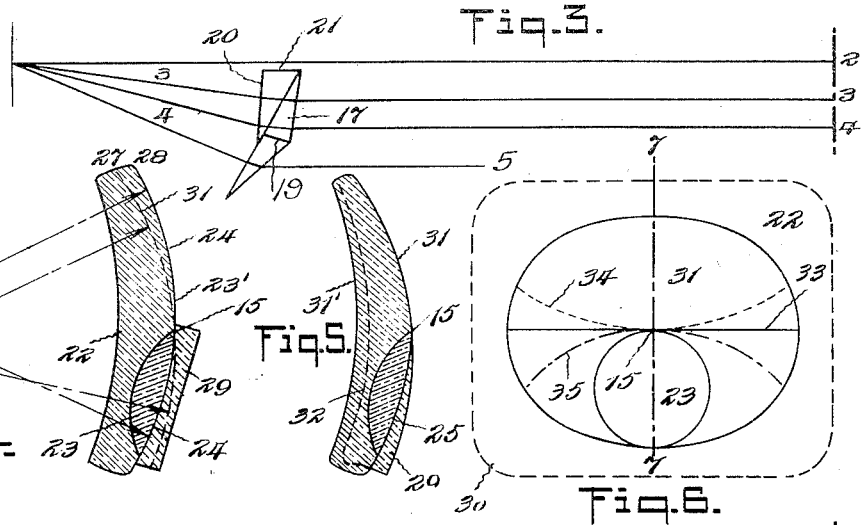
Fig.4. Fig.5. Fig.6.
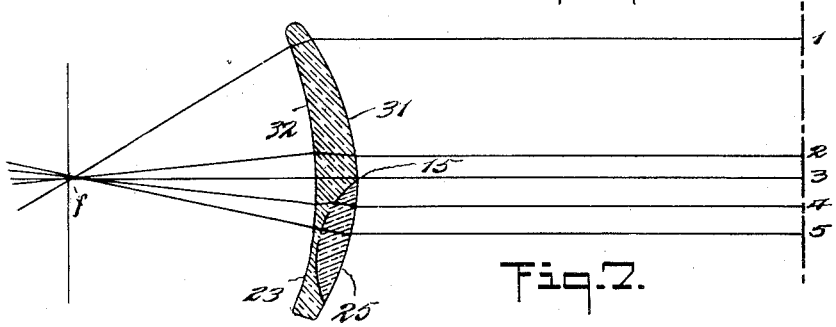
Fig.7.
INVENTOR
Jacob P. Koch
BY
Warren S. Orton
ATTORNEY Patented Mar. 6, 1928.

1,661,760

UNITED STATES PATENT OFFICE.

JACOB P. KOCH, OF NEW YORK, N. Y., ASSIGNOR OF ONE-HALF TO H. P. NICHOLS, OF NEW YORK, N. Y.

MODIFIED MULTIFOCAL LENS.

Application filed October 10, 1923. Serial No. 667,597.

The invention relates in general to improvements in ophthalmic bifocal and other multi-focal lenses and has particular reference to an improved construction of lens blanks designed to be made from any of the commercial forms of blanks now on the market and to a finished lens produced therefrom, and the invention also relates to an improved process or method of constructing such blanks and such finally finished lenses.

While the invention is generally applicable to any of the conventional forms of bifocal and multi-focal lens now in general use, the invention will be specifically described hereinafter in connection with its application to a bifocal lens of the type generally known as a kryptok fused bifocal as certain aspects of the invention are intended to overcome objections inherent in such lens. The invention features the retention in such improved lens of certain desirable advantages, such for instance, as extremely thin construction; and the avoidance of any marked line of separation between the long focal or distance vision portion and the short focal or reading portion.

One objection which quickly becomes apparent and quite annoying to the user of such lens is the loss in continuity of the objective as the line of sight changes with the vertical shifting of the eye-ball from one to the other portion of the known types of such lens. In other words, if a vertically disposed series of objectives or light sources be viewed through a bifocal lens of the usual construction, the user will of course see the upper objective, such as the point 1 in the showing in Figure 1, through the distant reading portion of the lens and will see the lower objective 5 through the reading portion of the lens, but when an attempt is made to see the objective or objectives when the line of sight is directed at the point of juncture between the distance and reading portions of the lens such objectives will not be seen. For instance, if any attempt be made to view objective points 3 and 4 these points will be either entirely invisible or at least distorted from their true position with relation to the other points. There is thus present an invisible or dead field and much annoyance and discomforture is caused by the resulting distortion of the objective as a whole when the eye is shifted to look through the distance and reading portions of the lens.

Accordingly, the primary object of the invention is to provide a multifocal lens which will maintain a continuity of the objective, or differently expressed, which will eliminate the dead space in the field of vision as the eye is shifted in its natural movement to look through the different portions of the lens. An incidental desideratum of the article aspect of the invention is to provide a form of semi-finished blank which can be made up by the manufacturers in several standard sizes with the distinctive double curve herein featured on one side and the other side of which can be easily ground by the optician to meet the prescriptive value desired.

Another object of the invention is to provide an easily practiced and economic method for grinding either and both sides of any lens blank to obtain such improved lens and for performing the grinding or equivalent forming operation in such way that the improved lens can be formed to meet any desired prescription value and performed in ways following as close as is practical known processes in the grinding of ophthalmic lenses.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is an explanatory diagrammatic view showing different optic paths of light when passed through a bifocal lens of conventional structure to the eye;

Figures 2 and 3 are explanatory diagrams; Figure 2 showing the lens of Figure 1, resolved into its component prisms and Figure 3 showing the addition thereto of a corrective prism constituting the basic feature of the invention herein disclosed;

Figures 4 and 5 are sectional views taken through the vertical meridian or minor axis of a lens blank showing succeeding steps in the method of constructing the modified bifocal lens herein featured;

Figure 6 is a view in front elevation of the initial blank in dotted lines and of the finished lens illustrating a preferred embodiment of the invention shown in full lines; and modified forms in dot and dash outline; and Figure 7 is a view similar to Figure 1 showing in full line the finished lens of Figure 6 taken on the line 7—7 of Figure 6.

In the following description and in the claims, parts will be identified by specific names for convenience of expression but they are intended to be as generic in their application to similar parts as the art will permit.

Referring to the showing in Figure 1 there is disclosed in vertical section and in the plane of the vertical meridian or minor axis a conventional form of bifocal lens 10. As is usual the lens includes a major or body portion 11, usually formed of crown glass having a relatively small index of refraction. On the anterior face 12 of the body portion is formed a countersunk or recess 13 in which is positioned a flint glass minor portion or button 14 generally referred to as a reading segment and having a relatively high index of refraction. The lens shown is a standard Kryptok periscopic convex form and is illustrated in its usual position in advance of the eye $f$. Reference will be made hereinafter to the optic axis 2 $c\ f$ of the body portion of the lens which passes through the center $c$ of the body portion 11 and through the focus $f$ of the eye ball. Reference will also be made to an objective indicated by a vertical line $o$ and to five points or sources of light rays in such line and numbered downwardly from 1 to 5 and which reference numbers will also be used to designate the light rays from the similarly numbered points and paralleling the optic axis. The upper point 1 is disposed so as to be visible when the eye is elevated to look through the body portion of the lens; the point 2 is positioned on the optic axis and of course is also visible through the body portion of the lens; the point 3 is in line with the point of juncture 15 between the body portion and the reading portion of the lens and in the minor axis of the lens indicated by the line 7—7 of Figure 6. The point 4 is slightly below the point 3 so as to be opposite the upper portion of the reading lens 14 and the point 5 is opposite the center of the lens 14 and visible to the eye as it is lowered to look through the center of the reading portion. From the showing of the optic paths in this figure it is obvious that points 1, 2, 3 and 5 are visible through the lens. As the eye-ball is rotated downwardly the succeeding points 1, 2, etc., are visible through the major or upper portion of the lens but as the line of vision approaches the jointure 15 and reaches the dotted line 15$f$ the succeeding points about 4, etc., disappear from sight. The reason for this is apparent from the inspection of the diagram for it is noted that light rays entering the upper portion of the lens 14 are deflected downwardly towards the thick portion or base of the upper portion of the lens 14 in accordance with the law of refraction and are bent downwardly along the line 4 which projects below the eye and of course outside of the line of vision. This deflection of the light rays is more clearly shown in Figure 2 where the lens of Figure 1 has been resolved into its component elementary prisms omitting corrective prism hereinafter identified and in which the prism 16 corresponds to the body portion 11 and the prism 17 corresponds to the upper half of the minor lens 14. From this construction it is appreciated that the ordinary bifocal lens when considered in its vertical meridian comprises two prisms, an upper prism having relatively low index of refraction and with its base 18 down and a lower prism having a relatively higher index of refraction also with its base 19 down.

The novelty of the present invention consists primarily in combining with the prism 17 a compensating prism 20 having its base 21 up and coinciding with the base 18 and both disposed in the optic axis of the lens. Such an additional prism is shown in Figure 3 from which it will be seen that the light ray 3 instead of being bent downwardly, as shown in Figure 2, is bent upwardly through such an angle as will cause it to pass through the point $f$ of the eye and which point will be referred to hereinafter as the principal focus of the lens for the prism system suggested in Figure 3.

While it is obvious that this coactive prism 20 might be added to the lens shown in Figure 1 it is quite obvious that any such addition would destroy the prescriptive value of the lens as a whole and accordingly the present disclosure features an approved means for adding the prism effect to compensate for the deviation of the light ray passing through the prism 17 and at the same time maintain for the lens as a whole its prescribed configuration.

Broadly, this is attained by a novel grinding of the usual multifocal lens blank in such way as will shift the prism base and thus cause the optic axis or thickest portion of the lens, in the case of a converging lens system, to be in a line passing through the juncture of the major and minor portions of the bifocal lens.

Assuming that it is desired to construct the usual periscopic convex bifocal lens a blank will be selected from stock which has the approximate configuration most closely approaching the desired finished lens and one such blank is shown in full lines at 22 (Figure 4). It will be understood that the blank button 23 corresponding to the bottom 14 of the showing in Figure 1 is of such dimension that when ground (following the usual practice) it will give the necessary addition to obtain, with the crown glass, if any, back of the same, the desired reading effect in the finished lens. The segment side 23' of the lens blank is then ground across its entire face from edge to edge with a curve which in the vertical meridian or minor axis of the lens will have that curvature which is desired on the anterior face 25 of the finished lens. When so ground the anterior face of the blank will have the curve shown in full line at 24 in Figure 4, struck from the center 26 with a definite radius in the case of a cylindrical or spherical curve in the minor axis. There is then calculated the dimensions of a prism having the index of refraction of the body portion of the lens and having such configuration as will counteract or compensate for the deviation of the light rays 4, etc., as they are passed through the reading portion 23 of the finished lens. A lens so calculated is shown in the prism 27, 28, 15, shown in Figure 4. The reading portion of the lens is then covered with a protecting sheet or cover glass 29 and the exposed portion, that is the crown glass portion is reground with the same curvature as the previously ground portion but obviously with the centers displaced, from 26 to 30, a distance to provide the determined dimensions of the calculated prism. It is understood therefore that in the finished lens the curve 31 extending vertically through the upper portion of the lens is identically the same as the curve 25 across the lower portion and that these curves meet at an angle the apex of which coincides with the point of juncture 15.

The cover glass or rather the unground remnants of the cover glass is then removed and the lens has the form approximately as shown in full line in Figure 5. It is then, of course, necessary to grind the posterior face 31' so as to complete the prescription and for this purpose the back of the lens is ground along the dotted lines as indicated at 32 in Figure 5.

There results a bifocal lens of the peculiar shape when viewed in vertical section as shown in Figure 7. It will be noted that the thickest portion of the lens is along the optic axis and that this optic axis intersects the point of juncture 15. It will be appreciated on comparing the finished lens shown in Figure 7, with the composite prism structure shown in Figure 3, that they are similar in that the upper portion of the completed lens is formed of a crown glass prism base down and that the lower portion of the lens or rather the portion which includes the upper half of the reading lens is composed of two prisms, a flint glass prism base down, and a correcting crown glass prism base up, and with its base coinciding with the base of the upper prism. In both illustrations it is seen that parallel light rays which strike the upper portion of the reading lens are not bent towards the center of the lens on emerging from the posterior face as shown in Figures 1 and 2 but are turned upwardly towards the eye and in this way all light rays falling on the reading lens between the point of juncture 15 and the center of the lens or base considered in the vertical meridian are bent towards and not away from the eye as is characteristic of present forms of bifocal lens.

In grinding the anterior face with curves which are sections of a sphere the line between the two curves will be straight across the major axis of the lens and intersecting the point 15 as shown at 33 in Figure 6. However, it is obvious that the curves may be otherwise disposed as in forming trifocal lens in which case the line of demarkation between the curves may take the concaved form shown at 34 or the convex form shown at 35. The lens blank shown in outline at 36 in Figure 6, is then cut to shape as shown in full lines following conventional practice in this respect.

In order to demonstrate the invention with a practical illustration let it be assumed that the prescription calls for O.U.+1.00 dis. Add O.U.+2.00
16/30 seg.

Assuming that the blank illustrated has an addition 2 to form a +7.00 surface, the operator grinds +7.00 on segment side leaving segment 30 mm. round. The cover glass 29 is then cemented over segment to stop scratching and also to give calculation so as to grind lens so that the prism base down will be 3 degrees from juncture point 15. A three degrees prism is needed to overcome prism base down on addition of 2.00 dioptheres and is determined as follows: ½ diameter of segment 15 mm. times addition of 2.00=30 mm. and as 10 mm. equals 1°, 30 mm. will equal 3° base down. The operator then grinds over cover glass 3 degrees base down to juncture point 15 and then grinds on reverse side minus 6.00 dioptheres leaving distance upper +1.00. The remaining portion of the cover glass is removed and the lens cut to size.

While the invention has been specifically described with the bicursal curve 24, 31 on the anterior or segment side of the lens, this curve or rather the two equal radius curves can be made just as readily on the opposite or posterior side. It is simply necessary that the apex of the angle formed by the two curves intersect the point of juncture, in the minor axis of the lens, between the parts of different focal lengths.

It is to be understood therefore that the expressions, anterior or posterior in the claims are simply convenient terms to idenitfy opposite sides of the lens. Further the invention has been described specifically in connection with its application to a lens in which the short and long focus are formed of glass of different indices of refraction but it is obvious that the invention is equally applicable to those cases where the entire blank is made of one integral piece of glass with a single index of refraction as where the reading segment is formed by a curve of short radius on the body portion of the lens. It is therefore to be understood in determining the scope of this disclosure that forming the short focus of the reading portion by configuration of one or both sides thereof is equivalent to forming the short focus by the use of a glass having an index of refraction higher than that of the glass forming the body portion.

Having thus described my invention, I claim:—

1. In the art of grinding a multifocal lens blank including a major portion having one index of refraction and a minor portion having a different index of refraction and said portions having a point of junction in the plane of the vertical meridian of the lens, the method which consists in grinding one face of the lens blank across both portions with a curve in said meridian having a fixed prescriptive value, placing a protecting sheet on said face over the minor portion and regrinding the exposed part of the major portion on said face with the same curvature and up to said point, thereby to form on one side of the finished lens two identical curves in the vertical meridian with the apex of the angle between the curves coinciding with said point of junction, removing the remaining portion of the protecting sheet and grinding the opposite face of the lens blank across its entire surface to complete the prescribed lens.

2. In the art of grinding a multifocal lens blank including a major portion having one index of refraction and a minor portion having a different index of refraction and said portions having a point of junction in the plane of the vertical meridian of the lens, the method which consists in grinding the anterior face of the lens blank with a certain prescription value, determining the dimensions of a prism formed of the material of the major portion necessary to compensate for the light ray deviation when a light ray is passed through the minor portion, grinding off from the major portion of said previously ground face between said point of junction and the adjacent edge, a portion thereof corresponding to the dimensions of said determined prism and leaving said portion with a curvature corresponding to the curvature of the minor portion and grinding the opposite face of the lens blank to give the major portion of the finished lens its desired prescriptive value.

3. In the art of grinding a multifocal lens which includes, in effect, an upper prism having a certain index of refraction with its base down and a lower prism with a greater index of refraction also with its base down, and a third prism made of the material of the upper prism, the method which consists in determining the dimensions of said third prism necessary to compensate for the deviation of light rays when passed through the lower prism, grinding said multifocal lens to dispose opposite said lower prism a compensating prism with its base up and corresponding to said determined prism whereby light passing through the upper portion of the lower prism is not materially deflected.

4. In the art of grinding a bifocal lens blank having a body portion and a reading segment composed of glass of different indices of refraction, the method which consists in grinding one face of the lens blank with a curve having a certain prescription value, regrinding the body portion with the same curvature from one point in the line of jointure between the body portion and the reading segment across the previously ground face to the opposite edge thereby to form on said face two identical curves forming an angle with the apex at said line of jointure and finishing the opposite face to give the body portion its prescription value.

5. In the art of grinding a multifocal lens blank including a major portion having one index of refraction and a minor portion having a different index of refraction and said portions having a point of junction in the plane of the vertical meridian of the lens, the method which consists in grinding one face with two curves in the plane of the vertical meridian and with said curved joining at said point of junction, said curves being identical in curvature but with different centers and then grinding the opposite face of the lens to have a single curve coacting with the curve on the major portion of the lens to give the finished lens its desired prescription value and the center of said single curve being located to dispose the thickest part of the major portion of the lens in a line containing said point of junction.

Signed at New York city, in the county of New York and State of New York, this 28th day of Sept., A. D. 1923.

JACOB P. KOCH.